US00RE40643E

(19) United States
(12) Reissued Patent
Stirm

(10) Patent Number: US RE40,643 E
(45) Date of Reissued Patent: Feb. 24, 2009

(54) ROTARY HAMMER

(75) Inventor: Michael Stirm, Oberursel (DE)

(73) Assignee: Black & Decker Inc., Mewark, DE (US)

(21) Appl. No.: 11/318,391

(22) Filed: Dec. 23, 2005

Related U.S. Patent Documents

Reissue of:
(64) Patent No.: 6,666,284
Issued: Dec. 23, 2003
Appl. No.: 09/826,841
Filed: Apr. 6, 2001

(30) Foreign Application Priority Data

Apr. 7, 2000 (GB) ..... 0008465.7

(51) Int. Cl.
*B25D 11/00* (2006.01)

(52) U.S. Cl. ..... 173/48; 173/104
(58) Field of Classification Search ..... 173/48, 173/104, 109, 128, 200, 201, 210, 212, 216
See application file for complete search history.

(56) References Cited

U.S. PATENT DOCUMENTS

| | | | | | |
|---|---|---|---|---|---|
| 4,280,359 | A | | 7/1981 | Schmid et al. | |
| 4,895,212 | A | * | 1/1990 | Wache | 173/48 |
| 5,036,925 | A | | 8/1991 | Wache | |
| 5,056,607 | A | | 10/1991 | Sanders | |
| 5,125,461 | A | | 6/1992 | Hoser | |
| 5,159,986 | A | * | 11/1992 | Hoser | |
| 5,320,177 | A | * | 6/1994 | Shibata et al. | 173/48 |
| 5,373,905 | A | | 12/1994 | Bleicher et al. | |
| 5,379,848 | A | | 1/1995 | Rauser | |
| 5,787,996 | A | | 8/1998 | Funfer | |
| 5,842,527 | A | | 12/1998 | Arakawa et al. | |
| 6,015,017 | A | | 1/2000 | Lauterwald | |
| 6,035,945 | A | * | 3/2000 | Ichijyou et al. | 173/48 |
| 6,192,996 | B1 | * | 2/2001 | Sakaguchi et al. | 173/48 |
| 6,460,627 | B1 | * | 10/2002 | Below et al. | 173/48 |
| 6,510,903 | B2 | | 1/2003 | Funfer | |

FOREIGN PATENT DOCUMENTS

| | | |
|---|---|---|
| DE | 3 322 963 A | 1/1985 |
| EP | 0 775 555 A | 5/1987 |
| EP | 0 589 337 A | 3/1994 |

* cited by examiner

*Primary Examiner*—Rinaldi I. Rada
*Assistant Examiner*—Nathaniel Chukwurah
(74) *Attorney, Agent, or Firm*—Scott B. Markow; Adan Ayala

(57) ABSTRACT

A rotary hammer includes a spindle 18 which can be rotatably driven by an intermediate shaft 24 by way of a drive device. A tool holder 16 is arranged for rotation with the spindle 18, and for releasably holding a bit or tool for selective rotation and/or reciprocation. A pneumatic hammering arrangement facilitates repeated impacting of the bit or tool for reciprocation within the tool holder (16). A mode change mechanism includes a knob 18 for selectively operating the rotary hammer in any of three modes, identified as a rotary drive only mode, a hammer only mode and a rotary hammer mode.

38 Claims, 7 Drawing Sheets

ROTARY HAMMER

Matter enclosed in heavy brackets [ ] appears in the original patent but forms no part of this reissue specification; matter printed in italics indicates the additions made by reissue.

*CROSS-REFERENCE TO RELATED APPLICATION*

*This application is a Reissue of U.S. Pat. No. 6,666,284 B2, issued Dec. 23, 2003, which claims priority to Great Britain application Serial No. 0008465, filed Apr. 17, 2000.*

BACKGROUND OF THE INVENTION

This invention relates to a rotary hammer, and particularly relates to a rotary hammer with a mode change mechanism for switching the rotary hammer for operation in any one of a hammer only mode, a rotary drive only mode and a rotary hammering mode.

In a hammer only mode of a conventional rotary hammer, a bit is inserted into a tool holder of the hammer and is repeatedly struck by a hammering mechanism and is not rotatably driven. In a rotary drive only mode, the bit is rotatably driven and is not subject to impacts from the hammering mechanism. In a rotary hammering mode, the bit is repeatedly struck by the hammering mechanism and is simultaneously rotatably driven.

Conventional rotary hammers of this type typically include a spindle mounted for rotation within a housing of the hammer which can be driven by a rotary drive arrangement, selectively engageable and disengageable with a pinion driven by a motor of the hammer. The spindle rotatably drives a tool holder of the hammer which in turn rotatably drives a tool or bit releasably secured within the hammer. A piston is generally slideably located within the spindle and is reciprocally driven by a hammer drive mechanism which translates the rotary drive of a hammer motor to a reciprocating drive of the piston. A ram, also slideably located within the spindle, forward of the piston, follows the reciprocation of the piston due to successive reversing pressures in an air cushion within the spindle between the piston and the ram. The ram repeatedly impacts an anvil slideably located within the spindle forward of the ram which transfers the forward impacts from the ram to the tool or bit, for limited reciprocation within the tool holder at the front of the hammer. The mode change mechanisms for such hammers can selectively engage and disengage the rotary drive to the spindle and the reciprocating drive to the piston.

In a known type of mode change mechanism, a single mode change actuator is used to switch the hammer between different modes. However, mechanisms of this type tend to be relatively complex, use parts which are intricate and/or difficult to manufacture inexpensively in bulk, with sturdy qualities that can withstand sustained use of the hammer, and/or are relatively difficult to assemble.

A known mode change arrangement is disclosed in U.S. Pat. No. 5,159,986, and includes a mode change knob having a first cam element for activating and de-activating hammering, and a second cam for activating and deactivating rotary drive. The disclosed arrangement also includes the option of operating at either of two drive speeds. In a first position of the first cam element, rearward movement of the spindle is blocked, which prevents the drive from being transmitted to the hammer drive arrangement. In a second position of the first cam, rearward movement of the spindle occurs when the tool or bit is pressed against a work surface.

This rearward movement of the spindle results in the engagement of two coupling parts which allows the drive to be transmitted from an intermediate shaft to the hammer drive arrangement.

The second cam arrangement, as described in U.S. Pat. No. 5,159,986, is used to guide an adjustment element along a rod mounted in the housing of the hammer, which adjustment element engages spindle drive gears to shift the gears between three positions. In a first of the three positions, a drive gear engages a spindle lock to prevent rotation of the spindle, and relates to of a surface of the first cam whereby drive is transmitted to the hammer drive arrangement. In a second position, a first drive gear engages the intermediate shaft to drive the spindle at a first speed of rotation, and, in a third position, a second drive gear engages the intermediate shaft to drive the spindle at a second speed. The three positions of the drive gears, as they relate to the orientation of the second cam element, are co-ordinated with the blocking and non-blocking positions, in relation to the orientation of the first cam element, in order to co-ordinate the activation of the spindle at the required speed with the activation of hammering.

The mode change arrangement as disclosed in U.S. Pat. No. 5,159,986 requires many non-standard type parts such as the first and second cam surfaces, an adjustment element, a bearing and a cage, which have to interact to change between the modes of operation. Such parts are relatively expensive to manufacture in such a way that the parts can survive sustained use of the hammer and still provide smooth changes between the different modes of operation of the hammer. Also, the assembling of the parts to provide such a mode change arrangement is relatively difficult, which further adds to the cost of manufacturing such hammers. Further, a biasing means between the knob and the adjustment element is required to bias the gears or teeth into position for meshing until one of the gears has rotated sufficiently to allow actual meshing to occur. This results in additional cost and complexity.

SUMMARY OF THE INVENTION

Therefore, it is an object of this invention to provide a rotary hammer having a simple and reliable mode change mechanism for selectively operating in a hammer only mode, a rotary hammer mode, or a rotary drive only mode.

Another object of this invention is to provide a rotary hammer having a mode change mechanism which utilizes primarily standard engineering parts such as splined shafts, gear wheels, splined sleeves and springs.

A further object of this invention is to provide a rotary hammer having a mode change mechanism which utilizes primarily standard engineering parts which are sturdy and inexpensive to manufacture, and relatively easy to assemble.

With these and other objects in mind, this invention contemplates a rotary hammer, which includes an intermediate shaft rotatably drivable by a motor, and a spindle which can be driven about an axis thereof by the intermediate shaft through a spindle drive arrangement. The rotary hammer further includes a tool holder arranged for rotation with the spindle for releasibly holding a bit or a tool for reciprocation, a pneumatic hammering arrangement located within the spindle which can repeatedly impact the bit or tool held within the tool holder. The pneumatic hammering arrangement includes a piston which can be reciprocally driven by a hammer drive arrangement for translating rotary drive from the intermediate shaft to a reciprocating drive for the piston. The rotary hammer further includes a mode changing mechanism for changing the operation of the hammer amongst a hammer only mode, a rotary hammer mode, and a rotary drive only mode. The mode change mechanism includes a spindle driving member rotatably mounted on the intermediate shaft for driving the spindle drive arrangement, a hammer driving sleeve rotatably mounted on the intermediate shaft for driving the hammer drive arrangement, and a mode change sleeve, which surrounds the intermediate shaft and which is permanently driven by and shiftable along the intermediate shaft. The switching of the actuator by a user shifts the mode change sleeve along the intermediate shaft to any one of three positions, such that, in a first rotary drive only position, the mode change sleeve transmits rotary drive to the spindle driving member and to transmit rotary drive to the spindle drive arrangement. In a second hammer only position, the mode change sleeve transmits rotary drive to the hammer driving sleeve to transmit rotary drive to the hammer drive arrangement. In a third rotary hammer position, the mode change sleeve transmits rotary drive to the spindle driving member and to the hammer driving sleeve to transmit rotary drive to the spindle drive arrangement and to the hammer drive arrangement.

This invention further contemplates the mounting of the hammer drive sleeve and the spindle drive member rotatably on the intermediate shaft, and the mounting of the mode change sleeve shiftably and non-rotatably along the intermediate shaft. This facilitates use of the mode change sleeve to transfer rotary drive from the intermediate shaft to the hammer drive sleeve and/or the spindle drive member by simply shifting the mode change sleeve along the intermediate shaft to selectively engage the hammer drive sleeve and/or the spindle drive member. The parts required for this mode change mechanism are standard engineering parts, such as a shaft and sleeves rotatable or non-rotatable on the shaft and optionally shiftable along the shaft. The sleeves have parts such as gear wheels or teeth, which are selectively engageable with each other. Such parts can be manufactured inexpensively and of sturdy structure, and can be easily assembled to provide a simple and reliable mode change mechanism.

In further contemplation of this invention, preferably, an intermediate shaft driving member, preferably a gear which is non-rotatable on the intermediate shaft, is in permanent engagement with a mode change sleeve driven member, preferably a set of teeth on the mode change sleeve, so that rotation of the intermediate shaft rotatingly drives the mode change sleeve.

Still, in further contemplation of this invention, in a preferred arrangement, the hammer drive sleeve is located towards the rear of the mode change sleeve and has a driven member, preferably a set of teeth, which is engageable with a driving member, also preferably a set of teeth, on the mode change sleeve to transmit rotary drive from the intermediate shaft to the hammer drive sleeve. Preferably, the mode change sleeve driven member, which engages the intermediate shaft driving member, is axially extended and also forms the mode change sleeve driving member, which is engageable with the hammer drive sleeve driven member, to transmit rotary drive from the intermediate shaft to the hammer drive arrangement. Using a single extended driven and driving member, such as an extended set of teeth, again simplifies the structure of the mode change sleeve.

This invention also contemplates, in a preferred arrangement, the spindle drive member being located towards the front of the mode change sleeve and has a driven member, preferably a set of teeth, on the mode change sleeve to transmit rotary drive from the intermediate shaft to the spindle drive member. Again, it is preferred that the mode change sleeve driven member which engages the intermediate shaft driving member is axially extended to also form the mode change sleeve driving member which is engageable with the spindle drive member to transfer rotary drive from the intermediate shaft to the spindle drive member. Using a single extended driven and driving member, such as an extended set of teeth, again simplifies the structure of the mode change sleeve.

The spindle drive member may be a spindle drive sleeve which is rotatably mounted on the outside of the intermediate shaft. Alternatively, the spindle drive member may be a spindle drive pinion which is rotatably mounted within the front end of the intermediate shaft.

When the above preferred arrangements are both used on the hammer, the mode change mechanism is arranged such that, in a first rotary drive only position, the mode change sleeve is shifted to a forward position on the intermediate shaft to transmit rotary drive to the spindle driving member by way of the mode change sleeve driving member and the spindle drive member driven member. In a second hammer only position, the mode change sleeve is shifted to a rearward position on the intermediate shaft to transmit rotary drive to the hammer driving sleeve by way of the mode change sleeve driving member and the hammer drive sleeve driven member. In a third rotary hammer position, the mode change sleeve is shifted to an intermediate position on the intermediate shaft between the forward and rearward positions and transmits rotary drive to the spindle driving member and transmits rotary drive to the hammer driving sleeve.

In a preferred embodiment, the switching of the single actuator shifts the mode change sleeve by way of a mode change member. The mode change member may be mounted on a housing part of the hammer so as to be slideable in a direction substantially parallel to the intermediate shaft. The mode change member is preferably provided with a mode change arm, preferably a ring, which extends laterally of the mode change member. The mode change arm at least partly surrounds at least a part of the mode change sleeve and is connected to the mode change sleeve such that shifting of the mode change member shifts the mode change sleeve by way of the mode change arm amongst the three positions.

In order to insure transmission of rotary drive between the parts, which may not initially be in meshing alignment when the hammer is first switched to one of the three modes of operation, a biasing arrangement is located between the actuator and the mode change sleeve in order to bias the sleeve towards a position on the intermediate shaft which corresponds to the position to which the actuator is switched. When the hammer includes a mode change member having a mode change arm as described above, it is preferred that the biasing arrangement includes a first spring means located between a forward end of the mode change sleeve and a forward facing part of the mode change arm and a second spring means located between a rearward end of the mode change sleeve and a rearward facing part of the mode change arm.

Preferably, a spindle lock is provided on the hammer to lock the spindle against rotation when the hammer is in the hammer only mode. When the hammer includes a mode change member, as described above, it is preferred that the spindle lock include a first locking means located on the mode change member, which first locking means is engageable with a second locking means provided on the spindle when the mode change member is shifted to a hammer only mode position to lock the spindle against rotation.

The actuator may be a rotatable knob mounted on a housing part of the hammer such that the rotation of the knob rotates an eccentric pin which pin is slideably engaged, preferably with a slot in the mode change member, in order to shift the mode change member and thereby shift the mode change sleeve amongst the three mode positions.

The mode change mechanism described above is suited to the type of hammer having a pneumatic hammering arrangement which includes a reciprocally driven piston, which reciprocally drives a ram by way of a closed air cushion. The ram repeatedly impacts an anvil which is driven, in a forward direction, to impact a bit or tool held in the tool holder. This arrangement is particularly suited to the type of hammer in which the intermediate shaft is substantially parallel to the spindle.

It is preferred that the spindle drive member include a driving member, preferably a gear, which is in permanent engagement with the spindle drive engagement, which preferably includes a gear.

It is also preferred that the hammer drive arrangement is a wobble plate drive arrangement.

Preferably, a releasable detent arrangement is provided for releasably latching the actuator in the required mode switch position. This is important if the hammer includes means for biasing the mode change mechanism into meshing engagement when the meshing parts are initially not aligned.

Other objects, features and advantages of the present invention will become more fully apparent from the following detailed description of the preferred embodiment, the appended claims and the accompanying drawings.

DETAILED DESCRIPTION OF THE PREFERRED EMBODIMENTS OF THE INVENTION

Figure 1:
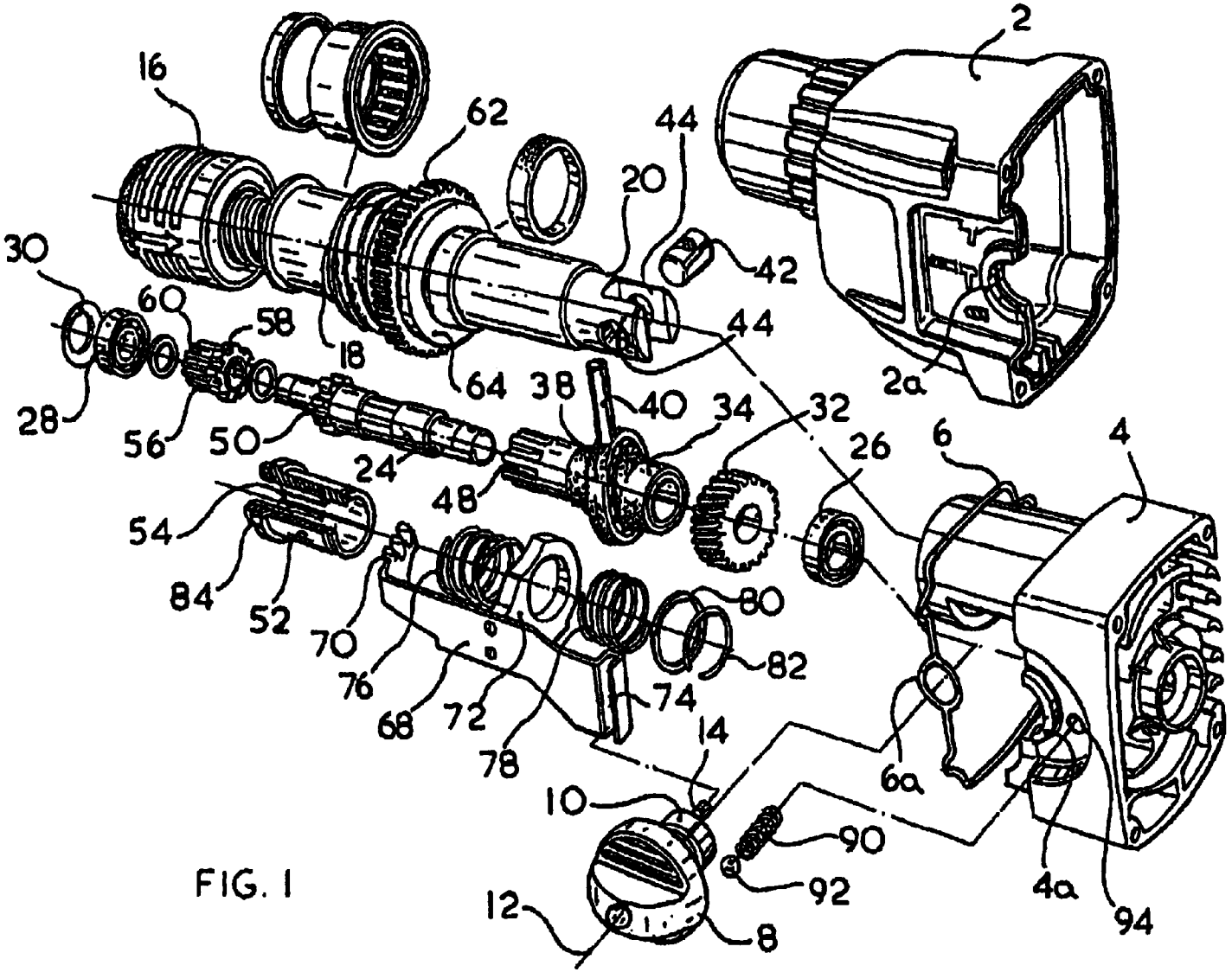
FIG. 1 is an exploded perspective view showing a layout of the components of a rotary hammer mode change mechanism in accordance with certain principles of the invention.

Referring to FIGS. 1, 2a, 2b and 2c, a first embodiment of a rotary hammer includes a forward housing part 2 and a central housing part 4, which are held together by threaded fasteners (not shown) to form a housing for a hammer spindle, a spindle drive arrangement, a hammer drive arrangement and a mode change mechanism. A resilient housing seal 6 fits between the housing parts 2 and 4 in a complementary recess provided in co-operating end surfaces of the housing parts to form a seal between the housing parts. The housing parts 2 and 4 are each formed with semi-circular recesses 2a and 4a, respectively, which co-operate to form a circular recess, lined with a ring section 6a of the housing seal 6, within which a mode change knob 8 is mounted for rotation about a mode change axis 12. The mode change knob 8 has an axle with an enlarged portion 10 which is captured within the hammer housing when the housing parts 2 and 4 are assembled together. In this manner, the mode change knob 8 is secured to the hammer housing. An eccentric pin 14 is formed with and extends from an end of the mode change axle for slideably moving a mode change member 68, as described below.

The rotary hammer includes a spindle 18 which is mounted for rotation within the hammer housing in a conventional manner. Also, a hollow piston 20 is located slideably within the rear of the spindle 18 in a conventional manner. The hollow piston 20 is reciprocated within the spindle 18 by a hammer drive arrangement as described in more detail below. A ram 21 follows the reciprocation of the piston 20 in the usual manner due to successive reversing pressures in an air cushion within the spindle 18 between the piston and the ram. The reciprocation of the ram 21 causes the ram to repeatedly impact an anvil 22 which repeatedly impacts a tool or bit (not shown). The tool or bit is releasably secured to the rotary hammer by a tool holder of conventional design, such as and SDS-Plus type tool holder 16, which enables the tool or bit to reciprocate within the tool holder to transfer the forward impact of the anvil 22 to a surface to be worked, such as a concrete block. The tool holder 16 also transmits rotary drive from the spindle 18 to the tool or bit secured within the tool holder.

The rotary hammer is driven by a motor (not shown), which has a pinion (not shown) for rotatably driving an intermediate shaft 24 by way of a drive gear 32. The intermediate shaft 24 is mounted for rotation within the hammer housing, parallel to the hammer spindle 18 by means of a rearward bearing 26 and a forward bearing 28. A spring washer 30 urges the intermediate shaft 24 rearwardly and is used to damp any reciprocatory motion which is transmitted to the intermediate shaft by way of a wobble plate hammer drive arrangement described below. The intermediate shaft 24 has a driving gear 50, either integrally formed therewith or press fit onto shaft so that the driving gear rotates with the shaft. Thus, whenever power is supplied to the motor, the driving gear 50 rotates along with the intermediate shaft 24.

The hammer drive arrangement includes a hammer drive sleeve 34 which is rotatably mounted on the intermediate 24 and which has a wobble plate track 36 formed around the sleeve at an angle to the axis of the intermediate shaft. A wobble plate ring 38, having an extending pin 40, is mounted for rotation around the wobble plate track 36 by way of ball bearings 39 in a conventional manner. The end of the wobble pin 40, remote from the wobble plate ring 38, is mounted through an aperture in a trunnion 42 which is pivotally mounted to the rear end of the hollow piston 20 by way of two arms 44 having aligned apertures formed therethrough. Thus, when the hammer drive sleeve 34 is rotatably drive about the intermediate shaft 24, a wobble plate drive (which is formed by the wobble plate track 36, the wobble plate ring 38, the ball bearings 39, the wobble pin 40, the trunnion 42 and the arms 44) reciprocally drives the hollow piston 20 in a conventional manner. The hammer drive sleeve 34 has a set of driven splines 48 formed on a forward end of the sleeve. The driven splines 48 are selectively engageable with the driving gear 50 by way of the mode change mechanism described below. When the intermediate shaft 24 is rotatably driven by the motor pinion, and the mode change mechanism engages the driving splines 48 of the hammer drive sleeve 34, (1) the driving gear 50 rotatably drives the hammer drive sleeve, (2) the piston 20 is reciprocally driven by the wobble plate drive, and (3) the tool or bit mounted in the tool holder 16 is repeatedly impacted by the anvil 22 by way of the action of the ram 21.

The spindle drive member includes a spindle drive sleeve 56 which is mounted for rotation about the intermediate shaft 24. The spindle sleeve 56 includes a set of driving teeth 60 at the forward end thereof which are permanently in engagement with the teeth of a spindle drive gear 62. The spindle drive gear 62 is mounted non-rotatably on the spindle 18 by way of a driving gear 64 which has a set of teeth formed on the internal circumferential surface thereof which are permanently engaged with a set of drive teeth 66 formed on the outer cylindrical surface of the spindle 18. Thus, when the spindle drive sleeve 56 is rotatably driven, the spindle 18 is rotatably driven, and this rotary drive is transferred to the tool or bit by way of the tool holder 16. The drive sleeve 56 has a driven gear 58 located at a rearward end of the drive sleeve which can be selectively driven by the intermediate shaft driving gear 50 by way of the mode change mechanism.

The mode change mechanism, which can be used to selectively actuate the hammer drive arrangement and/or the spindle drive arrangement, includes the mode change member 68 which is slideably mounted within the housing on guide members (not shown) mounted within or formed integrally with the housing. The mode change member 68 is formed with a set of spindle lock teeth 70 which can be selectively engaged with the spindle drive gear 62 to lock the spindle, against rotation, by way of the drive gear. The mode change membr 68 has a mode change ring 72 secured to a central region thereof so that the ring extends laterally of the member. The mode change ring 72 is slideably mounted over a mode change sleeve 52. A pair of coil springs, forward spring 76 and rearward spring 78, are mounted surrounding the mode change sleeve 52 in order to position the mode change ring 72 with respect to the mode change sleeve. The forward spring 76 acts between an annular flange 84, located towards the forward end of the mode change sleeve 52, and the forward annular face of the mode change ring 72. The rearward spring 78 acts between the rearward annular face of the mode change ring 72 and a stop ring 80, which is mounted towards the rearward end of the mode change sleeve 52 by a snap ring 82.

The mode change member 68 is formed with a slot 74 which extends in a direction substantially perpendicular to the direction of sliding of the mode change member. The eccentric pin 14 of the mode change knob 8 is slideably received within the slot 74 in the mode change member 68. In this manner, as the mode change knob 8 is rotated by the user of the hammer about the axis of the knob, the eccentric pin slides along the slot 74. This causes the mode change member 68 to slide forwards or backwards within the housing in order to move the mode changing ring 72 forwards or backwards with respect to the intermediate shaft 24 and to move the spindle lock teeth 70 forwards or backwards with respect to the spindle drive gear 62.

A detent arrangement includes a spring 90 and a ball bearing 92 and is situated in a bore 94 provided in the housing part 4 so that the ball bearing is urged by the spring into one of a number of pockets (not shown) which are provided in the underside of the knob 8. Each pocket is positioned so that it corresponds to a mode position of the knob 8, with the ball bearing 92 resting in a first-elected one of the pockets which is associated with the most recently selected mode of operation. When the knob 8 is moved toward one of the other mode positions in order to change the operating mode of the rotary hammer to a newly selected mode position, a user must overcome the biasing force of the spring 90 to push the ball bearing 92 out of the first-elected one of the pockets in the underside of the knob. Once the knob 8 is moved into the newly selected mode position, the ball bearing 92 is urged by the spring 90 to engage a second-selected one of the pockets which corresponds to the newly selected mode position. Once the ball seats in the second-selected one of the pockets, the knob 8 is latched against movement out of the newly selected mode position.

Figure 2A:
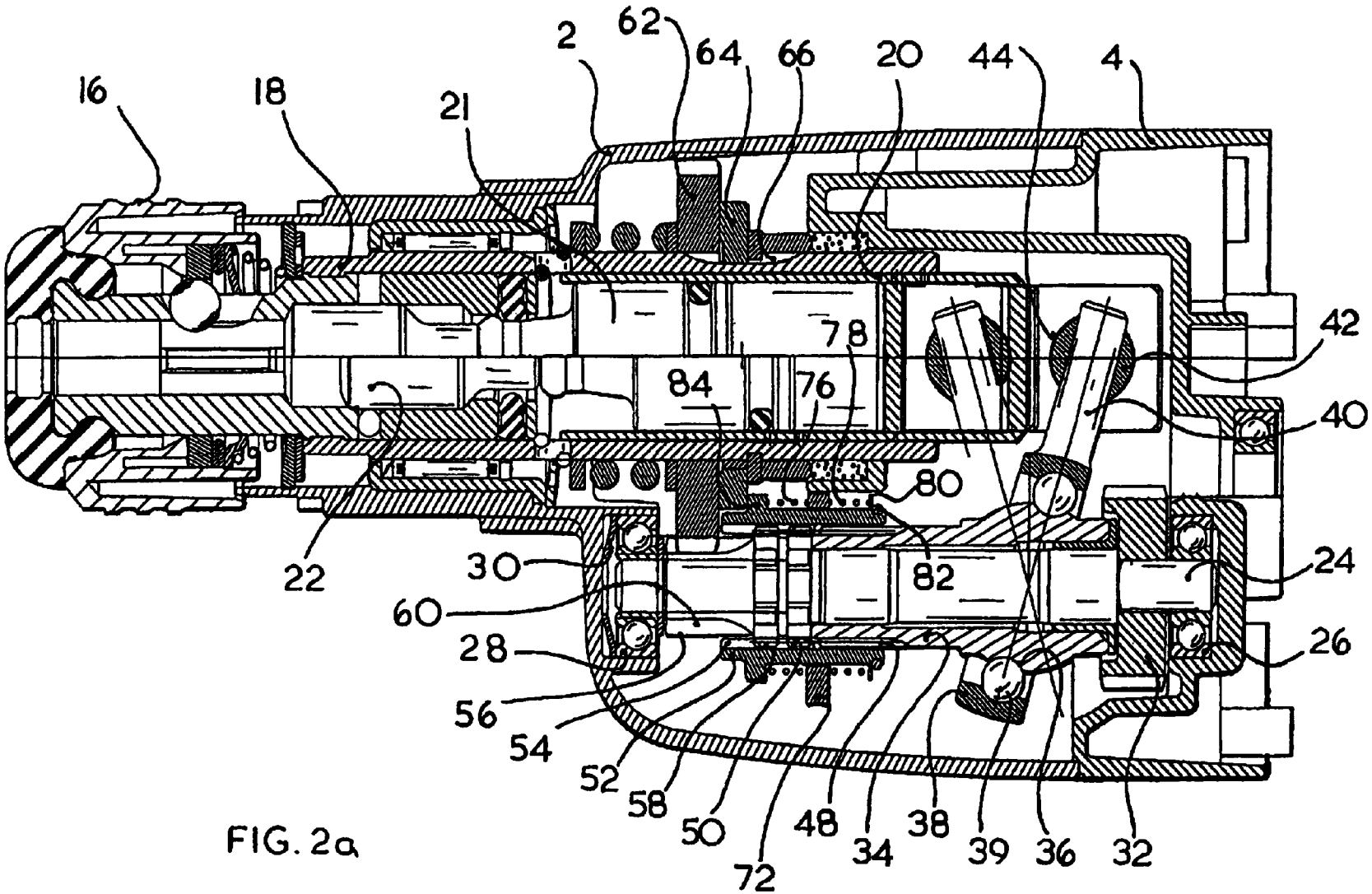
FIG. 2a is a sectional view showing a first embodiment of a rotary hammer, including the mode change mechanism of FIG. 1, in a rotary drive only mode, or drilling mode, in accordance with certain principles of the invention.

As shown in FIG. 2a, the rotary hammer is in the rotary drive only mode in which the spindle 18 is driven rotationally and the hammer drive arrangement is disengaged. The mode change knob 8 is in the farthest position to which it can be rotated in a clockwise direction and so the eccentric pin 14 lies forwardly of the axis 12 of the knob and maintains the mode change member 68 in the forwardmost position. In this position, the spindle lock teeth 70 are located forward of the spindle drive gear 62 which is free to rotate in order to rotationally drive the spindle 18. The mode changing ring 72 is in its forwardmost position and urges the mode change sleeve 52 forwardly by way of the spring 76. In this manner, the internal teeth 54 of the sleeve 52 are disengaged from the hammer drive splines 48 on the hammer drive sleeve 34 and so that the internal teeth 54 of the mode change sleeve 52 are engaged with the driving gear 50 on the intermediate shaft 24 and the driven gear 58 on the spindle drive sleeve 56.

As the internal teeth 54 are disengaged from the hammer drive splines 48, rotation of the intermediate shaft 24 is not transmitted to the hammer drive sleeve 34 which remains stationary as the intermediate shaft is rotated by the motor. Thus, no hammering action occurs. However, the engagement of the internal teeth 54 of the mode change sleeve 52 with the driving gear 50 of the intermediate shaft 24 and the driven gear 58 of the spindle drive sleeve 56 transmits rotary drive from the intermediate shaft to the spindle drive sleeve. This rotary drive is then transmitted to the spindle 18 by way of the driving teeth 60 on the spindle drive sleeve 56, the spindle drive gear 62 and the spindle drive ring 64. Accordingly, the rotary hammer operates in the rotary drive only or drilling mode.

The rotary hammer is moved into rotary drive only mode by rotating the mode change knob 8 clockwise, and the knob is latched in its rotary drive only position by the detent arrangement 90 and 92. When the rotary hammer is moved into the rotary drive only mode from the hammer only mode as the knob 8 is rotated clockwise, it is possible that the internal teeth 54 of the mode change sleeve 52 are not in alignment with the teeth 60 of the drive gear 58 of the spindle drive sleeve 56. If this is so, then as the mode change ring 72 is shifted forwardly and the forward movement of the mode change sleeve 52 is blocked by the mis-aligned teeth, the spring 76 is compressed and acts to urge the mode change sleeve toward its forward position. Thus, with the knob 8 latched in the rotary drive only position, as soon as the intermediate shaft 24 has rotated by a small angle required to align the internal teeth 54 with the teeth of the driven gear 58, the spring 76 urges the mode change sleeve 52 forwardly into the position shown in FIG. 2a so that the internal teeth 54 of the mode change sleeve 52 mesh with the drive gear 58 of the spindle drive gear 56. Thereafter, rotation of the intermediate shaft 24 is transmitted to the spindle 18.

Figure 2B:
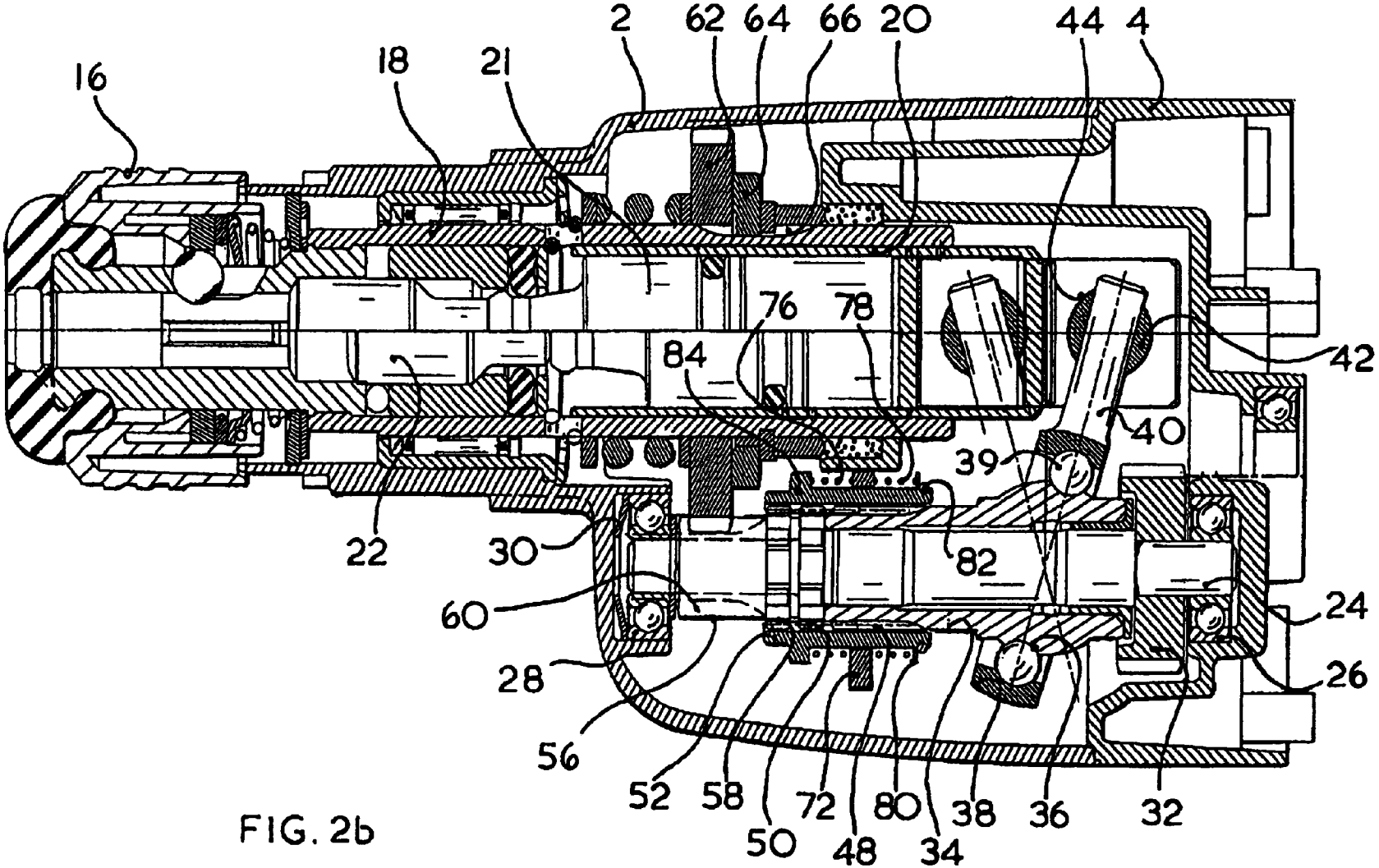
FIG. 2b is a sectional view showing the rotary hammer of FIG. 2a, including the mode change mechanism of FIG. 1, in a rotary hammer mode in accordance with certain principles of the invention.

As shown in FIG. 2b, the rotary hammer is in the rotary hammer mode in which the spindle 18 is driven rotationally and the hammer drive is engaged. The mode change knob 8 is in an intermediate position and the eccentric pin 14 is located above the axis 12 of the mode change knob and maintains the mode change member 68 in an intermediate position. In this position, the spindle lock teeth 70 remain located forward of the spindle drive gear 62, which is free to rotate in order to rotationally drive the spindle 18. The mode change ring 72 is in an intermediate position and urges the mode change sleeve 52 into an intermediary position by way of the spring 76 or the spring 78, depending on the previous mode of operation of the rotary hammer. In this intermediate position, the internal teeth 54 of the sleeve 52 are engaged with the hammer driven splines 48 on the hammer drive sleeve 34 and with the driving gear 58 on the spindle drive sleeve 56.

As the internal teeth 54 are engaged with the hammer driven splines 48, rotation of the intermediate shaft 24 is transmitted to the hammer drive sleeve 34 which rotates with the intermediate shaft. Thus, rotary drive from the motor is translated into a reciprocating drive of the hollow piston 20 by way of the driving gear 50 of the intermediate shaft, the mode change sleeve 52, the hammer driven splines 48 on the hammer drive sleeve 34 and the wobble plate mechanism, whereby hammering action occurs. The engagement of the internal teeth 54 of the mode change sleeve 52 with the driving gear 50 of the intermediate shaft 24 and the driven gear 58 of the spline drive sleeve 56 transmits rotary drive from the intermediate shaft to the spindle drive sleeve 52. This rotary drive is then transmitted to the spindle 18 by way of the driving teeth 60 on the spindle drive sleeve 56, the spindle drive gear 62 and the spindle drive ring 64. Accordingly, the rotary hammer operates in the rotary hammer mode. Note that the rotary hammer can be moved into the rotary hammer mode by rotating the mode change knob 8 either counter-clockwise from the rotary drive only position or clockwise from the hammer only mode position.

When the rotary hammer is moved into the rotary hammer mode from the rotary drive only mode as the knob 8 is rotated in a counter-clockwise direction, it is possible that the internal teeth 54 of the mode change sleeve 52 are not in alignment with the driven splines 48 of the hammer drive sleeve 34. In this instance, as the mode change ring 72 is shifted rearwardly and the rearward movement of the mode change sleeve 52 is blocked by the mis-aligned teeth, the spring 78 is compressed and acts to urge the mode change sleeve 52 towards the its intermediate position. Thus, with the knob 8 latched in the rotary hammer position, as soon as the intermediate shaft 24 has rotated by the small angle required to align the splines 48 of the hammer driving sleeve 34 with the internal teeth 54 of the mode change sleeve 52, the spring 78 urges the mode change sleeve rearwardly into the position shown in FIG. 2b so that the internal teeth 54 mesh with the splines 48. Thereafter, rotation of the intermediate shaft 24 is transmitted to the hammer drive arrangement as well as to the spindle drive arrangement.

When the rotary hammer is moved to the rotary hammer mode from the hammer only mode as the knob 8 is rotated clockwise, it is possible that the internal teeth 54 of the mode change sleeve 52 are not in alignment with the teeth of the driven gear 58 of the spindle drive sleeve 56. If this is so, as the mode change ring 72 is shifted forwardly and the forward movement of the mode change sleeve 52 is blocked by the mis-aligned teeth, the spring 76 is compressed and acts to urge the mode change sleeve 52 towards its intermediate position.

Thus, with the knob 8 latched in the rotary hammer position, as soon as the intermediate shaft 24 has rotated by the small angle required to align the teeth of the spindle drive sleeve 58 with the internal driving teeth 54 of the mode change sleeve 52, the spring 76 urges mode change sleeve forwardly into the position shown in FIG. 2b so that the internal teeth 54 of the mode change sleeve meshes with the teeth of the spindle drive gear 58. Thereafter, rotation of the intermediate shaft 24 is transmitted to the spindle drive arrangement as well as to the hammer drive arrangement.

Figure 2C:
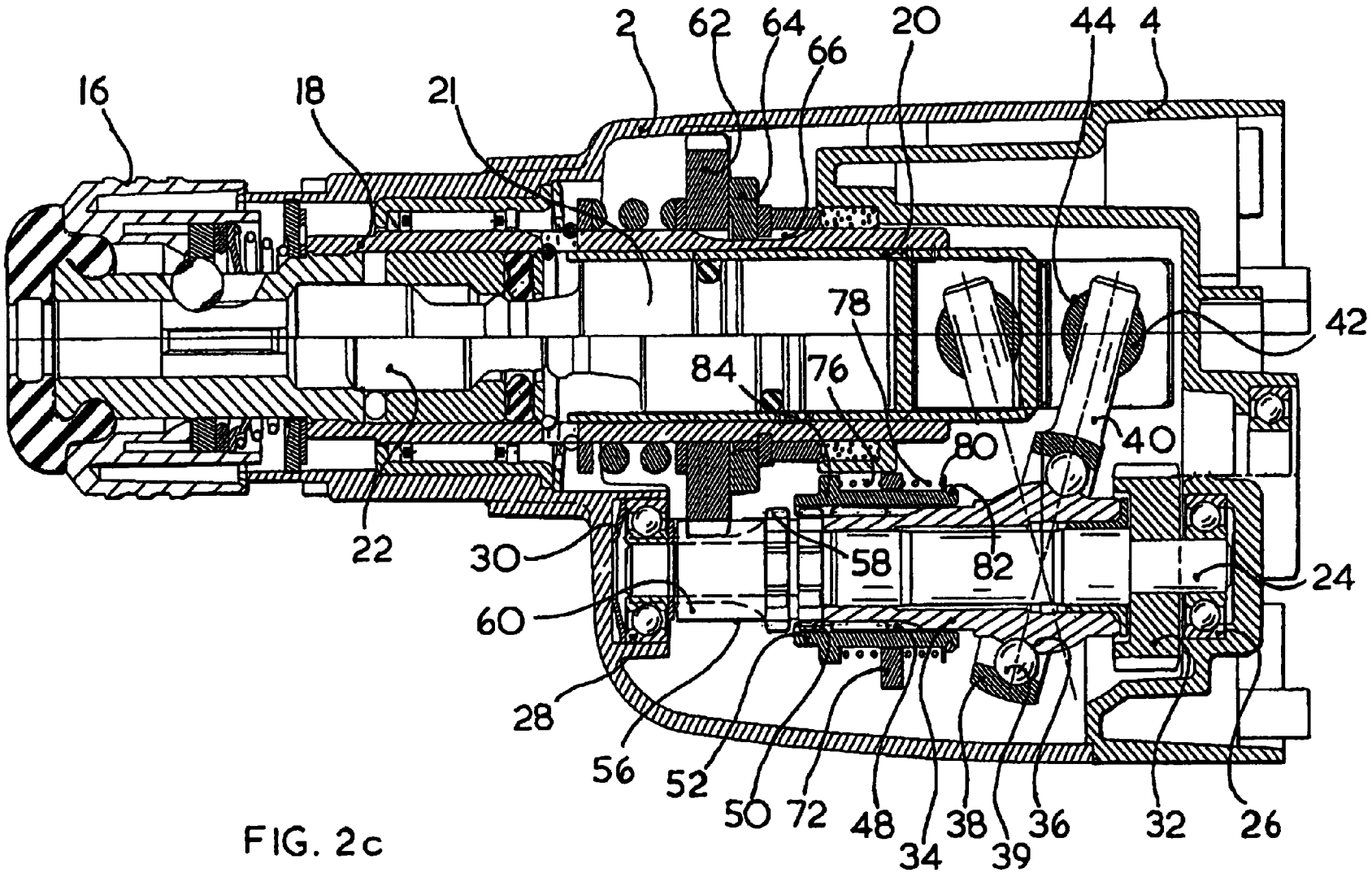
FIG. 2c is a sectional view showing the rotary hammer of FIG. 2a, including the mode change mechanism of FIG. 1, in a hammer only mode in accordance with certain principles of the invention.

As shown in FIG. 2c, the rotary hammer is in the hammer only mode in which the spindle 18 is locked against rotation and the hammer drive arrangement is engaged. The mode change knob 8 is latched in the farthest position to which it can be rotated in a counter-clockwise direction where the eccentric pin 14 is rearwardly of the axis 12 of the mode change knob and maintains the mode change member 68 in its rearward most position. In this position, the spindle lock teeth 70 are in engagement with the spindle drive gear 62, where the spindle drive gear and the spindle 18 are locked against rotation.

In the hammer only mode, the mode change ring 72 is in its rearmost position and urges the mode change sleeve 52 rearwardly by the way of the spring 78 so that the internal teeth 54 of the drive sleeve 52 are engaged with the hammer drive splines 48 on the hammer drive sleeve 34, whereby the internal teeth 54 are disengaged from the driven gear 58 on the spindle drive sleeve 56. As the internal teeth 54 engage with the hammer drive splines 48, rotation of the intermediate shaft 24 is transmitted to the hammer drive sleeve 34, which rotates the intermediate shaft. This rotational drive to the hammer drive sleeve 34 is translated into reciprocating drive for the piston 20 by way of the hammer drive arrangement. Thus, hammering action occurs. The disengagement of the internal teeth 54 of the mode change sleeve 52 from the driven gear 58 of the spindle drive sleeve 56 facilitates that no rotary drive is transmitted from the intermediate shaft 24 to the spindle drive sleeve which, therefore, remains stationary as the intermediate shaft rotates. Accordingly, the rotary hammer operates in the hammer only mode.

The rotary hammer is moved into the hammer only mode by rotating the mode change knob 8 counter-clockwise. When the rotary hammer is moved into the hammer only mode from the rotary drive only mode as the knob 8 is rotated counter-clockwise, it is possible that the internal teeth 54 of the mode change sleeve 52 are not in alignment with the driven splines 48 on the hammer drive sleeve 34. If this is the case, then as the mode change ring 72 is shifted rearwardly and the rearward movement of the mode change sleeve 52 is blocked by the mis-aligned teeth, the spring 78 is compressed and acts to urge the mode change sleeve towards its rearmost position. Thus, with the knob 8 latched in the hammer only position, as soon as the intermediate shaft 24 has rotated by the small angle required to align the internal teeth 54 with the driven splines 48 of the hammer drive sleeve 34, the spring 78 urges the mode change sleeve 52 rearwardly into the position shown in FIG. 2c, so that the internal teeth 54 mesh with the driven splines. Thereafter, rotation of the intermediate shaft 24 is transmitted to the hammer drive sleeve 34.

Figure 3:
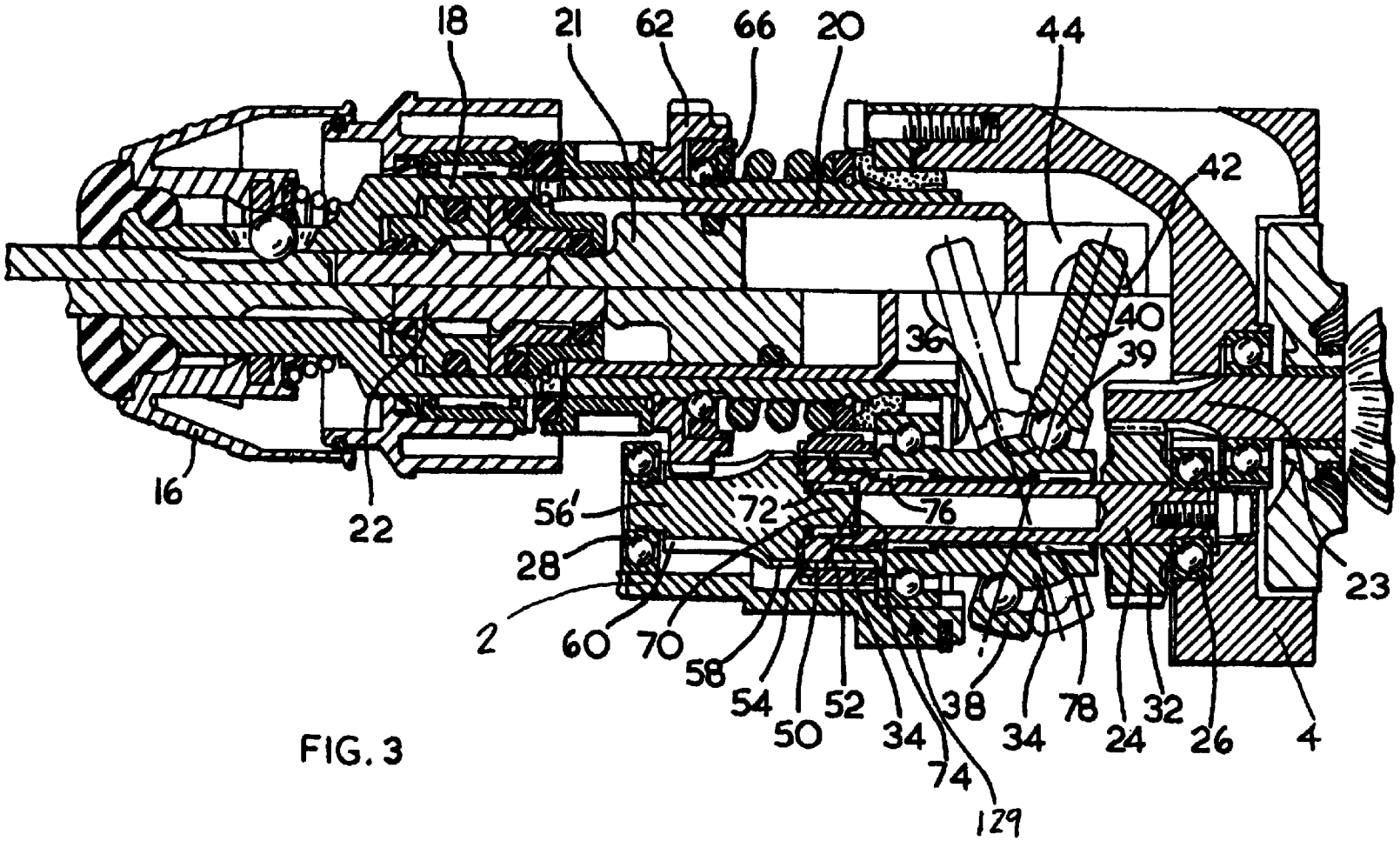
FIG. 3 is a sectional view showing a second embodiment of a rotary hammer, including the mode change mechanism of FIG. 1, in a hammer only mode in accordance with certain principles of the invention.
Figure 4A:
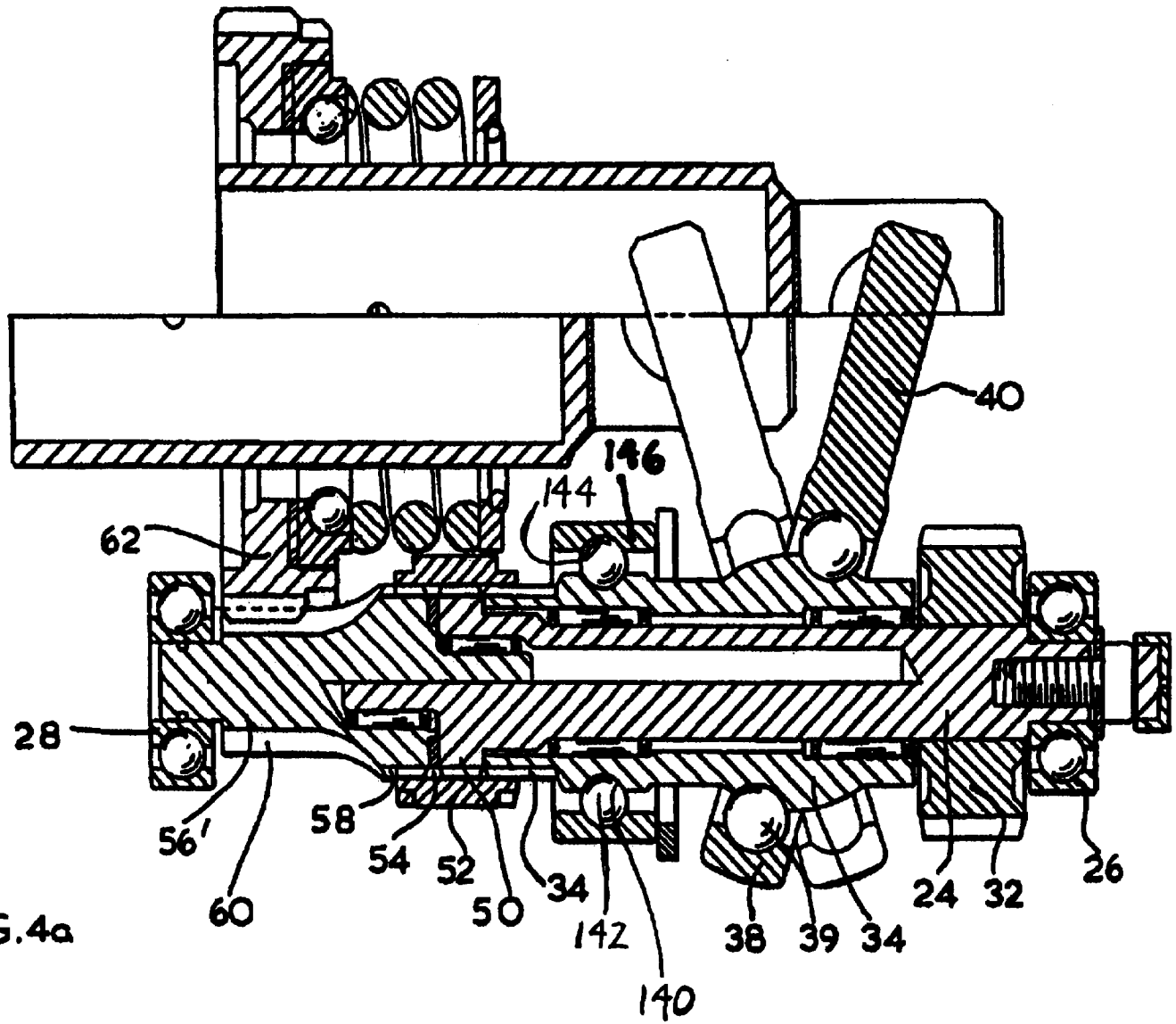
FIG. 4a is a sectional view showing the rotary hammer of FIG. 3, including the mode change mechanism of FIG. 1, in a rotary hammer mode in accordance with certain principles of the invention.
Figure 4B:
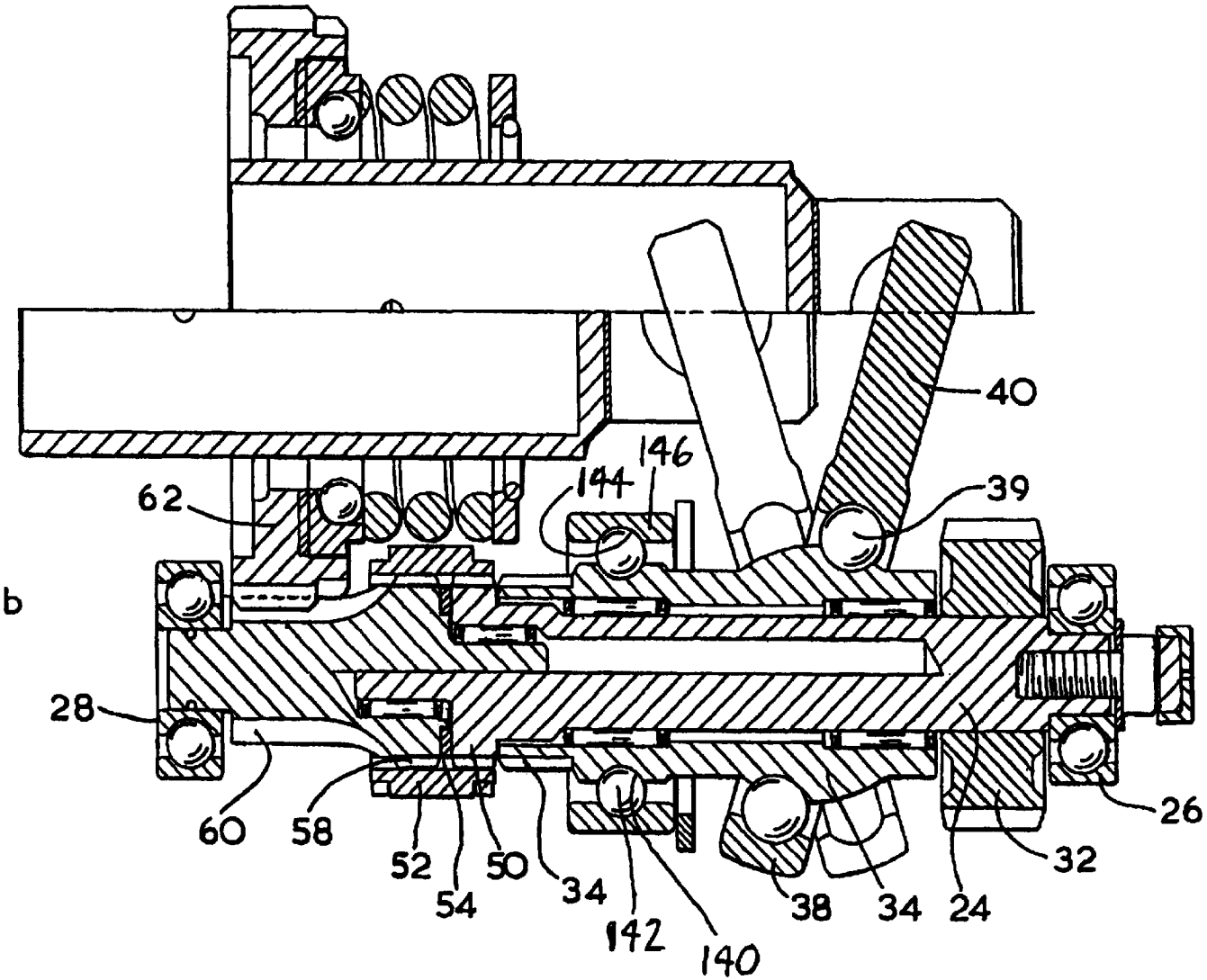
FIG. 4b is a sectional view showing the rotary hammer of FIG. 3, including the mode change mechanism of FIG. 1, in a rotary drive only mode, or a drilling only mode, in accordance with certain principles of the invention.

A second embodiment of a rotary hammer having a mode change mechanism according to the present invention is shown in FIGS. 3, 4a and 4b. The second embodiment is similar to the first embodiment of the rotary hammer, with like parts identified by like numerals, the difference being that the spindle drive member is a spindle drive pinion 56'. As shown in FIGS. 3, 4a and 4b, the front end of a motor drives the intermediate shaft 24 of the rotary hammer by way of a motor pinion 23 and the drive gear 32 of the intermediate shaft. In this way, the intermediate shaft 24 is always driven in rotation when the motor is switched on. The spindle drive pinion 56' has a rearward axial projection 70 which is rotatably mounted within a co-operating recess 72 within the front part of the intermediate shaft 24 by way of a needle bearing 74. Thus, the spindle drive pinion 56' can rotate relative to the intermediate shaft 24. The forward end of the spindle drive pinion 56' is rotatably mounted in a bearing 28 mounted in the rotary hammer housing. In the same way described above, rotary drive is transmitted from the intermediate shaft 24 to the spindle drive pinion 56' by the mode change sleeve 52 to rotatably drive the spindle 18 by way of the spindle drive gear 62.

The hammer drive sleeve 34 is rotatably mounted on the intermediate shaft 24 by way of needle bearings 76 and 78. Again, the hammer drive sleeve 34 can be selectively rotationally driven by the intermediate shaft 24 by way of the mode change sleeve 52 to initiate the hammering operation. The mode change sleeve 52 is axially switchable by an actuator linkage, similar to the type described above, between three positions to hammer only mode (FIG. 3), rotary hammer mode (FIG. 4a) and rotary drive only or drill only mode (FIG. 4b), in the manner described above.

*The hammer drive sleeve 34 and intermediate shaft are supported by an intermediate support bearing arrangement 129. The hammer drive sleeve 34 has formed on its external surface, forwardly of the wobble bearing arrangement 36, 38, 39, an annular channel 140 within which runs a set of bearing balls 142. The bearing balls 142 run between an inner race formed within the annular channel 140 of the hammer drive sleeve 34 and an outer race 144 formed in a bearing ring 146. The bearing ring 146 is used to support the intermediate shaft 24 and hammer drive sleeve 34 within the housing 2, 4. Thus, the intermediate shaft 24 is supported in the housing parts 2 and 4 by the rearward bearing 26, the forward bearing 28, and the intermediate support bearing arrangement 129 via the hammer drive sleeve 34.*

While the embodiments described above refer to rotary hammers within which the motor is in line with the hammer spindle (i.e., parallel thereto), the mode change mechanism is also suitable for the so called L-shaped hammers in which the axis of the motor is perpendicular to the spindle. In such L-shaped rotary hammers, the motor pinion will extend into the hammer housing from below and will mesh with an intermediate shaft drive gear (replacing the gear 32) which is a bevel gear.

In general, the above-identified embodiments are not to be construed as limiting the breadth of the present invention. Modifications, and other alternative constructions, will be apparent which are within the spirit and scope of the invention as defined in the appended claims.

What is claimed is:

1. A rotary hammer, which comprises:

an intermediate shaft (24) which is rotatably driven by a motor of the rotary hammer when power is supplied to the motor;

a spindle (18) which can be driven in rotation about its axis by the intermediate shaft 24 through a spindle drive arrangement (62,64);

a tool holder (16) arranged for rotation with the spindle (18) for releasably holding a bit or a tool such that the bit or tool can reciprocate;

a pneumatic hammering arrangement (20,21,22) located within the spindle (18) which can repeatedly impact the bit or tool held within the tool holder (16);

said pneumatic hammering arrangement comprising a piston (20) which can be reciprocally driven by a hammer drive arrangement (34,36,38,39,40,42) which can translate rotary drive from the intermediate shaft (24) to a reciprocating drive to the piston (20); and a mode change mechanism for changing the operation of the rotary hammer to operate in any of three modes, a rotary drive only mode, a hammer only mode or a rotary hammer mode;

said mode change mechanism comprising:

a single actuator (8) switchable by a user of the rotary hammer amongst the three modes of operation;

a spindle driving member (56) rotatable on the intermediate shaft (24) for driving the spindle drive arrangement (62,64);

a hammer driving sleeve (34) rotatable on the intermediate shaft (24) for driving the hammer drive arrangement (34,36,38,39,40,42); and a mode change sleeve (52) which is permanently driven by *the intermediate shaft* (*24*) and shiftable along the intermediate shaft (24) *to change the operation of the rotary hammer to operate in any of the three modes*;

where, upon the switching of the actuator (8) by a user, shifts the mode change sleeve (52) along the intermediate shaft (24) amongst the three modes positions, such that in a first rotary drive only position the mode change sleeve (52) transmits rotary drive to the spindle driving member (56) to transmit rotary drive to the spindle drive arrangement (62,64), in a second hammer only position the mode change sleeve (52) transmits rotary drive to the hammer driving sleeve (34) to transmit rotary drive to the hammer drive arrangement (34,36,38,39,40,42), and in a third rotary hammer position the mode change sleeve (52) transmits rotary drive to the spindle driving member (56) and to the hammer driving sleeve (34) to transmit rotary drive to the spindle drive arrangement (62,64) and to the hammer drive arrangement (34,36,38,39,40,42).

2. The rotary hammer according to claim 1, which further comprises:

a driven member (54) on the mode change sleeve (52);

a driving member (50) mounted non-rotatably on the intermediate shaft (24) in permanent engagement with the driven member (54), so that rotation of the intermediate shaft rotatably drives the mode change sleeve.

3. The rotary hammer according to claim 1, which further comprises:

a driving member (54) on the mode change sleeve (52);

a driven member (48) on the hammer drive sleeve (34); and wherein the hammer drive sleeve (34) is located towards the rear of the mode change sleeve (52) and the driven member (48) is engageable with the drive member (54) to transmit rotary drive from the intermediate shaft (24) to the hammer drive sleeve (34).

4. The rotary hammer according to claim 3, wherein a driven member (54) on the mode change sleeve (52) which engages a driving member (50) on the intermediate shaft (24) is axially extended to form the driving member (54) of the mode change sleeve (52) which is engageable with the driven member (48) on the hammer drive sleeve (34).

5. The rotary hammer according to claim 1, which further comprises:

a driven member (58) on the spindle drive member (56);

a driving member (54) on the mode change sleeve (52); and wherein the spindle drive member (56) is located towards the front of the mode change sleeve (52) and the driven member (58) is engageable with the driving member (54) to transmit rotary drive from the intermediate shaft (24) to the spindle drive member (56).

6. The rotary hammer according to claim 5, wherein a driven member (54) of the mode change sleeve (52) which engages a driving member (50) of the intermediate shaft (24) is axially extended to form the driving member (54) which is engageable with the driven member (58) on the spindle drive sleeve (56).

7. The rotary hammer according to claim 1, which further comprises:

a driven member (48) on the hammer drive sleeve (34);

a driving member (54) on the mode change sleeve (52);

a driven member (58) on the spindle drive member (56);

the hammer drive sleeve (34) is located towards the rear of the mode change sleeve (52) and the driven member is engageable with the driving member (54) to transmit rotary drive from the intermediate shaft (24) to the hammer drive sleeve (34);

the spindle drive member (56) is located towards the front of the mode change sleeve (52) and the driven member (58) is engageable with the driving member (54) to transmit rotary drive from the intermediate shaft (24) to the spindle drive member (56); and the mode change mechanism is arranged such that in a first rotary drive only position the mode change sleeve (52) is shifted to a forward position on the intermediate shaft (24) to transmit rotary drive to spindle driving member (56) through the driving member (54) and the driven member 58, in a second hammer only position the mode change sleeve (52) is shifted to a rearward position on the intermediate shaft (24) to transmit rotary drive to the hammer driving sleeve (34) through the driving member (54) and the driven member (48), and in a third rotary hammer position the mode change sleeve (52) is shifted to an intermediate position on the intermediate shaft (24) between the forward and rearward positions and transmits rotary drive to the spindle driving member (56) through the driving member (54) and the driven member (58) and transmits rotary drive to the hammer driving sleeve (34) through the driving member (54) and the driven member (48).

8. The rotary hammer according to claim 1, which further comprises:

a mode changing member (68); and wherein the switching of the single actuator (8) shifts the mode change sleeve (52) through the mode change member (68).

9. The rotary hammer according to claim 8, which further comprises:

a housing part (2,4); and the mode change member (68) is mounted on the housing part (2,4) of the rotary hammer so as to be slideable in a direction substantially parallel to the intermediate shaft (24).

10. The rotary hammer according to claim 8, which further comprises:

a mode change arm (72) on the mode change member (68); and wherein the mode change arm (72) extends laterally of the mode change member (68) with the arm (72) surrounding at least a part of the mode change sleeve (52) and is connected to the mode change sleeve (52) such that shifting of the mode change member (68) shifts the mode change sleeve (52) through the mode change arm (72) amongst the three mode positions.

11. The rotary hammer according to claim 8, which further comprises:

a housing part (2,4);

a rotatable knob (8) forms the actuator (8) and is mounted on the housing part (2,4);

an eccentric pin (14) on the rotatable knob (8); and wherein when the rotatable knob (8) is rotated the eccentric pin (14) is rotated and slideably engages with the mode change member (68) in order to shift the mode change member (68) to shift the mode change sleeve (52) amongst its three positions.

12. The rotary hammer according to claim 1, which further comprises:

a biasing arrangement (76,78) which is located between the actuator 8 and the mode change sleeve (52) in order to bias the mode change sleeve (52) towards the position on the intermediate shaft (24) which corresponds to the position to which the actuator (8) is switched.

13. The rotary hammer according to claim 1, which further comprises:

a mode change member (68);

a mode change arm (72) on the mode change member (68);

a biasing arrangement (76,78), which comprises:

a first spring member (76); and a second spring member (78);

wherein the mode change arm (72) extends laterally of the mode change member (68) and at least partly surrounds a part of the mode change sleeve (52) and is connected to the mode change sleeve (52) such that shifting of the mode change member (68) shifts the mode change sleeve (52) through the mode change arm (72) amongst its three positions;

the biasing arrangement (76,78) located between the actuator (8) and the mode change sleeve (52) in order to bias the mode change sleeve (52) towards the position on the intermediate shaft (24) which corresponds to the position to which the actuator (8) is switched; and the first spring member (76) located between a forward end of the mode change sleeve (52) and a forward facing part of the mode change arm (72) and the second spring member (78) located between a rearward end of the mode change sleeve (52) and a rearward facing part of the mode change arm (72).

14. The rotary hammer according to claim 1, which further comprises;

a spindle lock (70) to lock the spindle (18) against rotation when the rotary hammer is in a hammer only mode.

15. The rotary hammer according to claim 14, which further comprises:

a mode change member (68);

the spindle lock (70) comprising:

a first locking member (70); and a second locking member (62,64); and wherein the switching of the single actuator (8) shifts the mode change sleeve (52) through the mode change member (68) and the first locking member (70) is located on the mode change member (68) and engages the second locking member (62,64) located on the spindle (18) when the mode change member (68) is shifted to a hammer only mode position to lock the spindle (18) against rotation.

16. The rotary hammer according to claim 1, which further comprises:

the pneumatic hammering arrangement comprising:

a ram (21);

a reciprocally driven piston (20) which is reciprocally drives the ram (21) through a closed air cushion; and an anvil (22) which is repeatedly impacted by the ram (21) and, in turn, impacts the bit or tool held in the tool holder (16).

17. The rotary hammer according to claim 1, wherein the intermediate shaft (24) is substantially parallel to the spindle (18).

18. The rotary hammer according to claim 1, wherein:

the spindle drive member (56) comprises:

a driving member (60);

a driven member (62), which forms a part of the spindle drive arrangement (62,64); and wherein the driving member (60) is in permanent engagement with the drive member (62).

19. The rotary hammer according to claim 1, wherein the hammer drive arrangement is a wobble plate arrangement (36,38,39,40).

20. The rotary hammer according to claim 1, which further comprises:

a releasable detent arrangement (90,92,94) for releasably latching the actuator (8) in a mode switch position.

*21. The rotary hammer according to claim 1, wherein the mode change sleeve is a single sleeve.*

*22. A rotary hammer comprising:*

*a housing;*

*a tool holder coupled to the housing and configured to releasably hold a tool;*

*a spindle configured to rotate about a first longitudinal axis of the spindle to cause drilling motion of a tool held within the tool holder;*

*a piston that reciprocates within the spindle along the first longitudinal axis to cause hammering motion of a tool held within the tool holder;*

*a motor at least partially disposed in the housing;*

*an intermediate shaft configured to be rotated about a second longitudinal axis by the motor when power is supplied to the motor;*

*a spindle drive mechanism coupled to at least one of the intermediate shaft and the spindle to selectively transmit rotary motion of the intermediate shaft to rotary motion of the spindle;*

*a piston drive mechanism coupled to at least one of the intermediate shaft and the piston to selectively transmit rotary motion of the intermediate shaft to reciprocal motion of the piston;*

*a mode change mechanism configured to select among a drilling mode, a hammering and drilling mode, and a hammering mode, the mode change mechanism including a front sleeve portion and a rear sleeve portion each shiftable along the intermediate shaft and permanently driven by the intermediate shaft to change the operation of the rotary hammer to operate in any of the three modes, wherein the front sleeve portion is moveable along the second longitudinal axis to selectively couple the spindle drive mechanism to the intermediate shaft when in the drilling mode and the hammering and drilling mode to transmit rotary movement of the intermediate shaft to rotary movement of the spindle and to selectively decouple the spindle drive mechanism from the intermediate shaft when in the hammering mode so that rotation of the intermediate shaft does not cause rotation of the spindle, and wherein the rear sleeve portion is moveable along the second longitudinal axis to selectively couple the piston drive mechanism to the intermediate shaft when in the hammering and drilling mode and the hammering mode to transmit rotary movement of the intermediate shaft to reciprocating movement of the piston and to selectively decouple the piston drive mechanism from the intermediate shaft when in the drilling mode so that rotation of the intermediate shaft does not cause reciprocating movement of the piston;*

*an actuator switch moveable among three positions corresponding to the drilling mode, the hammering and drilling mode, and the hammering mode; and*

*a linkage that links the actuator switch to the mode change mechanism to effectuate the movement of the front and rear sleeve portions upon movement of the actuator switch.*

*23. The rotary hammer according to claim 22, wherein the front sleeve portion comprises a projection that can be selectively engaged with a recess on the spindle driving member when the mode change mechanism is in the drilling mode and the drilling and hammering mode.*

*24. The rotary hammer according to claim 22, wherein the rear sleeve portion comprises a projection that can be selectively engaged with a recess on the hammer driving member when the mode change mechanism is in the hammering mode and the drilling and hammering mode.*

*25. The rotary hammer according to claim 24, wherein the front sleeve portion comprises a projection that can be selectively engaged with a recess on the spindle driving member when the mode change mechanism is in the drilling mode and the drilling and hammering mode.*

*26. The rotary hammer according to claim 22, wherein the linkage comprises a bar that extends substantially parallel to the second longitudinal axis and at least one arm that extends laterally from the bar, the at least one arm being coupled to the mode change mechanism such that shifting of the bar along the second longitudinal axis moves the mode change mechanism among the drilling mode, the drilling and hammering mode, and the hammering mode.*

*27. The rotary hammer according to claim 22, wherein the actuator switch comprises a rotatable knob mounted on the housing and an eccentric pin coupled to the rotatable knob, wherein when the rotatable knob is rotated the eccentric pin is rotated and slideably engages with the linkage in order to shift the mode change mechanism among the drilling mode, the drilling and hammering mode, and the hammering mode.*

*28. The rotary hammer according to claim 22, further comprising a spring that biases the mode change mechanism toward one of the drilling mode, the drilling and hammering mode, and the hammer mode.*

*29. The rotary hammer according to claim 28, wherein the spring biases the front sleeve portion of the mode change mechanism to couple the intermediate shaft to the spindle drive mechanism.*

*30. The rotary hammer according to claim 28, wherein the spring biases the rear sleeve portion of the mode change mechanism to couple the intermediate shaft to the piston drive mechanism.*

*31. The rotary hammer according to claim 22, further comprising a spindle lock member to lock the spindle against rotation when the rotary hammer is in the hammering mode.*

*32. The rotary hammer according to claim 31, wherein the spindle lock member comprises a set of teeth that are fixed against rotation and that are moveable substantially parallel to the second longitudinal axis with the linkage to bring the set of teeth into engagement with the spindle drive mechanism.*

*33. The rotary hammer according to claim 22, further comprising a ram that is reciprocally driven by the piston through an air cushion, and an anvil that is repeatedly impacted by the ram and that, in turn, impacts the tool held in the tool holder.*

*34. The rotary hammer according to claim 22, wherein the intermediate shaft is substantially parallel to the spindle.*

*35. The rotary hammer according to claim 22, wherein the spindle drive mechanism comprises a first splined ring gear that is permanently fixed to the spindle and a second splined ring gear that engages the first splined ring gear, wherein the front sleeve portion of the mode change mechanism causes the second splined ring gear to rotate with the intermediate shaft.*

*36. The rotary hammer according to claim 22, wherein the piston drive mechanism comprises a wobble drive mechanism that converts rotary motion of the intermediate shaft to reciprocal motion of the piston.*

*37. The rotary hammer according to claim 22, wherein the actuator includes a releasable detent arrangement that releasably latches the actuator in at least one of the three positions.*

*38. The rotary hammer according to claim 22, wherein front sleeve portion and the rear sleeve portion are disposed on a single mode change sleeve.*

* * * * *

UNITED STATES PATENT AND TRADEMARK OFFICE

CERTIFICATE OF CORRECTION

PATENT NO. : RE 40,643 E
APPLICATION NO. : 11/318391
DATED : February 24, 2009
INVENTOR(S) : Michael Stirm It is certified that error appears in the above-identified patent and that said Letters Patent is hereby corrected as shown below:

Column 1, line 12:

after "Apr. 17, 2000." insert --More than one reissue application has been filed for the reissue of Patent No. 6,666,284. The reissue applications are application numbers 11/318,391 (the present application) and 12/283,260, which is a divisional reissue of Patent No. 6,666,284.--.

Signed and Sealed this

Thirtieth Day of March, 2010

David J. Kappos

David J. Kappos
*Director of the United States Patent and Trademark Office*